United States Patent Office 3,112,443
Patented Nov. 26, 1963

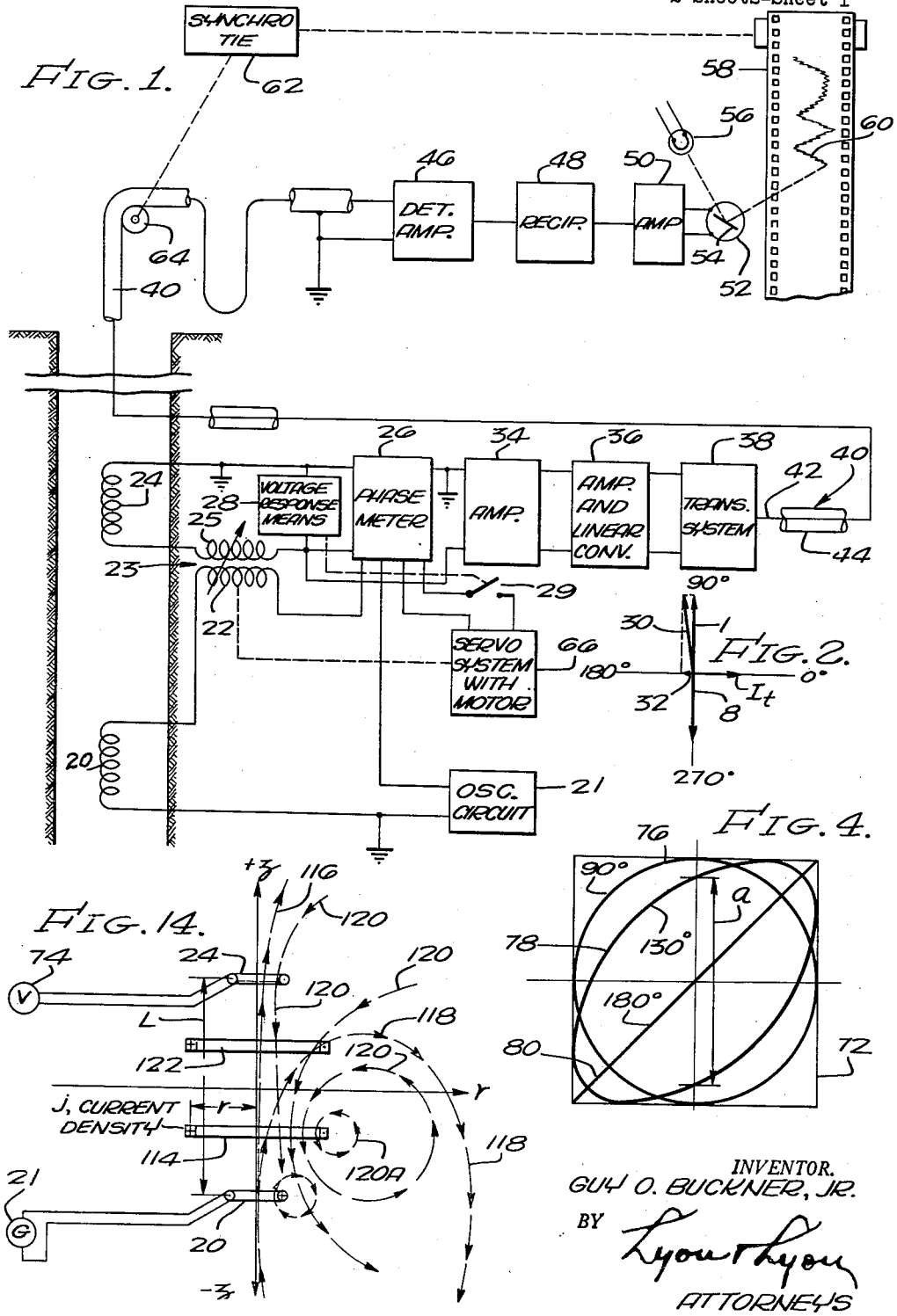

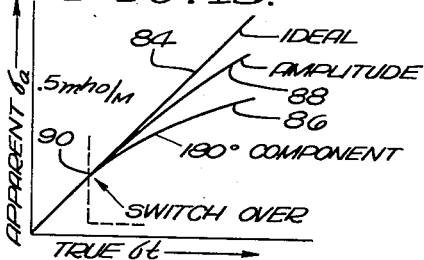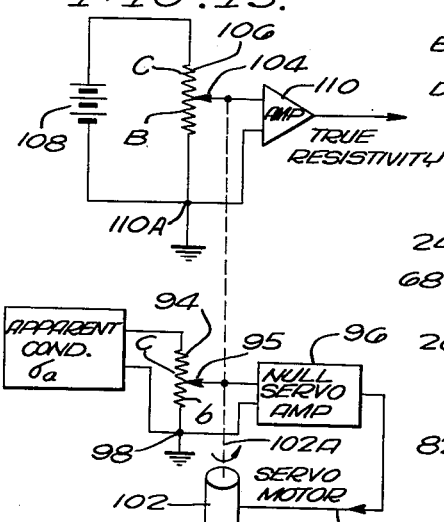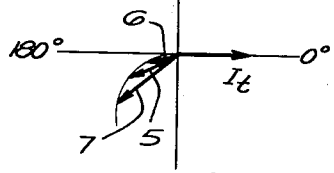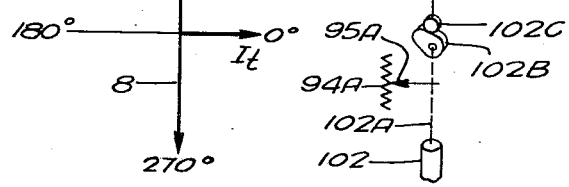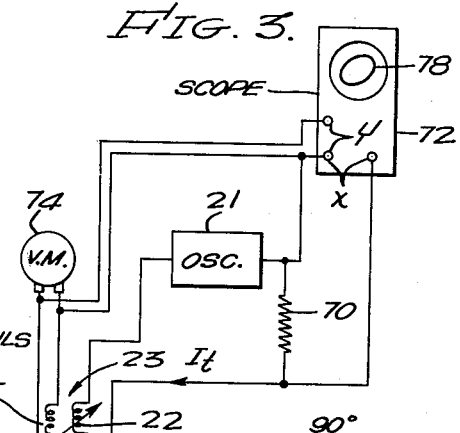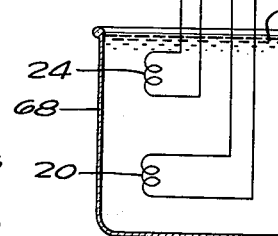

3,112,443
INDUCTION BOREHOLE LOGGING METHOD AND APPARATUS HAVING MEANS FOR BALANCING OUT A QUADRATURE PHASE COMPONENT AND MEANS TO RENDER THE BALANCING MEANS INOPERATIVE WHEN A PREDETERMINED CONDITION OCCURS
Guy O. Buckner, Jr., Houston, Tex., assignor to Halliburton Company, a corporation of Delaware
Filed Mar. 11, 1959, Ser. No. 798,624
9 Claims. (Cl. 324—6)

The present invention relates to bore hole logging and in particular to improved means and techniques whereby variations in earth formations traversed by a bore hole may be indicated more accurately. The present invention is particularly applicable to induction systems wherein eddy currents are induced in the ambient formations and the effect of such eddy currents is indicated for indicating either formation conductivity or resistivity. Another phase of the present invention is directed to an analog computer which in its operation provides compensation for deviations of apparent conductivity from true conductivity and the same is applicable not only to induction logging systems but electrical logging systems wherein resistivity or conductivity determinations are made without magnetic induction.

Present commercial induction logging systems are based on a primary indication of formation conductivity which is considered to be a linear function of the magnitude of eddy currents in the ambient formations produced by a constant A.C. magnetic field developed by a so-called transmitter coil. The effect of such eddy currents on an associated receiver coil is indicated in terms of a particular component of the voltage induced therein. This voltage component thus varies depending upon the intensity of the eddy currents in the formations. As will be demonstrated herein, the magnitude of the voltage component induced in the receiver coil is not a true indication, i.e. such voltage component does not vary linearly with the intensity of such eddy currents, particularly when the ambient formations are of high conductivity.

In general, a log which is developed solely by this information (without, for example, the use of an analog type computer or so-called reciprocator circuit), is a conductivity log since such varying voltage component varies with the current flow in the formations. In other words, the higher such current flow, the higher is the voltage component induced in the receiver coil and the higher is the conductivity in accordance with Ohm's law, subject, however, to the limitation as mentioned previously that erroneous results are accomplished when the conductivity is high unless certain precautions are taken.

The amplitude of the composite voltage developed in the receiver coil is a function of many different conditions. However, generalizing, such voltage may be broadly considered, for the present discussion, to consist of two components, one of such components being referred to as a quadrature component, in the form of an unwanted signal, which results from the direct coupling between the receiver and transmitter coils; and a second component of such receiver voltage may be considered generally to be a resistivity, conductivity or in phase component since such component is oftentimes considered to be a voltage induced in the receiver coil as a result of the magnetic field produced by the eddy currents and threading the receiver coil. It is demonstrated herein that this above-mentioned quadrature component in the form of an unwanted signal changes with changing formations, and further that more accurate indications of formation resistivity are produced when the magnitude of a particular voltage is recorded, irrespective of its phase, particularly so in high conductivity formations.

Hence, while usually the circuitry in an induction logging tool are preadjusted on the surface prior to lowering in a bore hole, such adjustments made on the surface are made with respect to particular conditions and with the expectation that differences in each formation conductivity will be indicated on a linear scale. In accordance with the present discovery, it has been found that the attainment of this desired result requires additional precautions that apparently have heretofore been considered unnecessary.

Heretofore it has been realized that the transmitter coil in an induction logging system not only produces eddy currents in the formation in accordance with the voltage induced therein by the current flowing in the transmitter coil, but also the transmitter coil induces an undesirable voltage in the receiver coil by direct transformer action. This undesirable voltage is sometimes referred to as the quadrature component or voltage since the same is considered to have a 90° phase relationship with respect to the transmitter coil current and also a 90° phase relationship with respect to that voltage induced in the receiver coil by the formation eddy currents. This latter voltage is oftentimes considered to be the desired voltage which is desired to be effectively measured and recorded to provide an indication of the conductivity of the formations through which such eddy currents flow.

Some means are usually provided to effectively balance out this undesired quadrature component using, for example, an auxiliary transformer having a primary winding through which the transmitter coil current flows for inducing a bucking or balancing voltage in a secondary winding connected in the receiver coil circuit; and, the mutual inductance between the windings of this transformer, for this purpose, is adjusted in the logging tool or sonde while it is on the surface under given conditions which, however, vary in the use of the logging tool, and, thus the adjustment may not be the best possible adjustment under all conditions encountered, particularly when no precautions are taken to guard against conditions encountered while the logging tool is in a bore hole. In the latter case, not only is the quadrature voltage balancing system altered undesirably, but of greater significance is the fact that the voltage which otherwise is indicative of formation currents is altered appreciably and thus the effects of changing conditions result in disproportionate and erroneous indications of conductivity or resistivity.

In a study of induction logging systems not only must the amplitude of the various voltage components which are induced magnetically in the receiver coil be considered, but also consideration must be given to the phase relationships of the various components, particularly when high conductivity formations are being logged. While the magnitude and phase of the various voltage components induced in the receiver coil are not readily susceptible to precise mathematical determinations, with laborious mathematical considerations based on assumptions which may or may not be strictly true, largely because the same are found to vary considerably in accordance with various conditions, novel teachings and structure are nevertheless incorporated in the present invention whereby more accurate determinations of resistivity or conductivity may be accomplished.

It is therefore an object of the present invention to provide an improved logging system in which indications of ambient formation resistivity are indicated or measured with greater accuracy and on a more linear scale.

In furtherance of the object stated in the previous paragraph, it is a further object of the present invention to provide an induction logging system wherein means are provided to provide a compensatory effect for the disproportionate relationship between apparent and true resistivity.

A further object of the present invention is to provide an improved induction logging system wherein phase-sensitive detection means for adjusting the magnitude of the quadrature component is automatically adjusted to produce indications of resistivity or conductivity when the formation conductivity is relatively low but, in accordance with important teachings of the present invention, such phase-sensitive means is rendered inoperative when formation conductivities are high to thereby, in such latter case, provide a more accurate logging system.

A further object of the present invention is to provide an improved logging system in which means are provided for compensating for what may be termed the "eddy current shielding effect" produced by formation eddy currents in the formations. The term "eddy current shielding effect" has reference to the fact that, as explained more fully herein, the composite voltage induced in the receiver coil decreases in magnitude and changes its phase with increasing formation conductivity, i.e. higher eddy currents may be considered, for this purpose, to establish a higher magnetic field between the transmitter and receiver coils with such magnetic field serving to effectively shield, in increasing amounts, the receiver coil from the transmitter coil and also from those ambient formations closest to the transmitter coil.

Another object of the present invention is to provide an improved logging system incorporating an analog computer which provides compensation between apparent and true conductivity, a subsidiary feature being that such analog computer performs also the function of a ratio detector or reciprocating circuit whereby conductivity indications are simultaneously and automatically converted into resistivity indications.

Another object of the present invention is to provide an improved induction logging system in which the accuracy of formation of conductivity indications or measurements is not detrimentally influenced by formations of relatively high conductivity.

Another object of the present invention is to provide an improved induction logging system in which a quadrature voltage balancing system is automatically operated when and as the logging tool traverses formations having a conductivity of, for example, less than one half mho per meter to thereby establish an adjustment which is maintained when and as the logging tool traverses formations of higher conductivity.

Another object of the present invention is to provide an induction logging system as indicated in the previous paragraph wherein only the in phase component is recorded when formation conductivities in the lower range are encountered and wherein the amplitude of a component, irrespective of its phase, is recorded in the higher range without an attempt being made, while logging in such higher range, to balance the quadrature component.

Other objects and advantages of this invention, it is believed, will be readily apparent from the following detailed description of a preferred embodiment thereof when read in connection with the accompanying drawings.

In the drawings:

FIGURE 1 illustrates a logging system embodying features of the present invention.

FIGURE 2 is a vector diagram illustrating logging in low conductivity formations.

FIGURE 3 illustrates an experimental setup in which the patterns illustrated in FIGURE 4 are obtained as well as the vector diagram in FIGURE 5.

FIGURE 4 illustrates scope patterns.

FIGURES 5-11 are a series of vector diagrams useful in explaining features of the present invention.

FIGURE 12 is a graph showing the variation of apparent conductivity with true conductivity under different conditions.

FIGURE 13 illustrates details of the reciprocal circuit indicated at 48 in FIGURE 1 and also incorporates features of the present invention.

FIGURE 14 illustrates generally the flow of formation eddy currents and is useful in explaining features of the present invention.

FIGURE 15 illustrates a modified construction involving the use of a cam in the arrangement shown in FIGURE 13.

A typical system embodying the invention is now discussed in connection with FIGURE 1. While the system shown, for purposes of simplicity, includes a single transmitter and a single receiver coil, it will be understood and appreciated that more than one of such coils may be used for transmitting and for receiving as is generally the case in present commercial logging systems to make the system more or less sensitive to various zones of formation.

The transmitter coil 20 is energized with current from a power oscillator circuit 21 operating at, for example, a frequency of 20 kilocyles. For this purpose usually the coil 20 is tuned to that frequency and means (not shown) are associated with such oscillator circuit for maintaining the transmitter coil current constant. One terminal of the oscillator circuit 21 is connected to one terminal of the transmitter coil 20 through the primary winding 22 of the adjustable balancing transformer 23, the other terminals of the coil 20 and the oscillator circuit 21 being grounded.

The receiver coil 24 has one of its terminals grounded and the other one of its terminals connected through the secondary winding 25 of the transformer 23 to one input terminal of a phase sensitive detector or phase meter 26, the other input terminal being grounded so that the voltage applied to the input circuit of the phase detector 26 includes those composite voltages induced magnetically in receiver coil 24 and that voltage induced by primary winding 22 into the secondary winding 25. This composite voltage is applied also to the voltage responsive means 28 in the form of a voltmeter for controlling the switch 29 in a servo system for purposes described later. This is all accomplished without appreciable current flow from coil 24, devices with high input impedances being used.

It is understood that, in accordance with conventional practice, the two coils 20 and 24 are mounted on a logging tool so as to be spaced along the axis of the well bore traversed by such tool and with the axis of each coil aligned with the well bore axis. When the ambient formations are of very low conductivity, the conditions shown in FIGURE 2 are approximately true. As shown in FIGURE 2, the voltages or voltage represented by vector 30 and induced in the receiver coil 24 as a result of current, $I_t$, flowing in the transmitter coil 20 may be considered to comprise essentially two components, namely a first voltage component which is represented as vector 1 and is induced directly by transformer action by coil 20, and a second voltage component 32 induced as a result of currents induced in the earth formations. FIGURE 2 also shows the same in phase relationship to the vector $I_t$, the current flowing in the transmitter coil 20.

The quadrature component 1 is balanced or substantially balanced out in the input circuit to the phase detector 26 by the voltage 8 which is properly phased and induced in the secondary winding 25 by the current $I_t$ flowing in the primary winding 22. The phase responsive means which includes phase meter 26 and servo system 66 operates so that the resultant voltage which is applied to amplifier 34 represents only such in phase component 32 when logging in formations having a conductivity less than approximately one half mho per meter.

The amplifier 34, which is stabilized for high gain, has its output in the form of an amplified 20 kc. signal applied to the input circuit of an amplifier and linear converter 36 in which unidirectional or D.C. voltage is developed in its output circuit.

The converted D.C. signal in the output of stage 36 is applied to the transmission system 38 for transmitting information over logging line 40 and to surface equipment receptive to such signal. The transmission system 38 is conventional and may, for example, include a multivibrator having an amplitude of a voltage developed therein modified in accordance with this D.C. signal and such modulated output is used in the form of a subcarrier for frequency-modulate a carrier transmitted over the logging line or cable 40 having an inner conductor 42 and a grounded sheath 44.

The signal received at the surface is suitably amplified and detected using conventional equipment illustrated generally as the detector and amplifying stage 46, and the output thereof is applied to a ratio detector or reciprocating circuit 48. The output of circuit 48, described later herein, may first be amplified in amplifier stage 50 before being applied to galvanometer 52 having a mirror 54 which is deflected in accordance with the converted signal for directing a beam of light from lamp 56 onto a photographic film 58 to produce the resistivity log 60.

It is understood, of course, that the film 58 is moved in synchronism with the logging tool in which the subsurface equipment is mounted and this is so indicated in FIGURE 1 by the synchro-tie 62 which is representative of well known means for accomplishing this result. For this purpose, the film 58 is illustrated as being moved synchronously with rotation of a pulley 64 over which the logging line or cable 40 is reeled.

While FIGURE 2 has been alluded to above for describing general aspects of the logging system, it will be seen from the following that special precautions are necessary when logging high conductivity formations. When logging in low conductivity formations, the switch 29 is closed and any unbalance in voltages 1 and 8 (FIGURE 2) as detected by the phase detector 26 results in operation of the servo system 66 which serves to adjust the transformer 23 to restore the balance between voltage vectors 1 and 8. When logging in formations of high conductivity, both the amplitude and phase of the resultant voltage induced in coil 24 changes due to increased eddy current flow, and the voltage responsive means 28 then serves to open switch 29 whereby no error signal is applied to the motor in the servo system 66 and hence the log 60 is recorded without an attempt to rebalance the transformer 23. The reason for this mode of operation is described hereinafter.

FIGURE 3 is a simplified version of a logging system, assuming for the present discussion that the balancing means 23 is absent, for illustrating in FIGURE 5 the manner in which the voltage measured at the receiver coil 24 varies with resistivity of the ambient formations which in this case is represented as liquid 66 in a large container 68, the liquid being changeable in conductivity by, for example, change in the liquid or by adding salt thereto. In FIGURE 3 an A.C. generator 21 generating, for example, 20 kc. current, is serially connected with the transmitter coil 20 and a resistance 70. This resistance 70 has its terminals connected to the so-called X-axis of an oscilloscope 72 whereby visual indications may be obtained representative of the current through the coil. This current is maintained constant. The receiver coil 24 is connected to the Y-axis terminals of the oscilloscope 72 and also a voltmeter 74 is connected across the receiver coil to indicate the amplitude of the voltage developed in coil 24. The oscilloscope 72 serves to compare the transmitter current $I_t$ with the induced receiver coil voltage for purposes of ascertaining the manner in which the phase of the receiver coil voltage varies with change of conductivity of the liquid 66 which is representative of formations of different conductivity. The various patterns observed on the oscilloscope under changing conductivity conditions is indicated in FIGURE 4. It is noted that in FIGURE 4, the representation 76 is a circle and this condition corresponds to the condition wherein there is either an absence of liquid or the liquid has extremely low conductivity i.e., a 90° phase relationship. With increased conductivity, the patterns illustrated at 78 and 80 are obtained, the representation 80 being an extreme condition wherein the conductivity of the liquid is assumed to be extremely high. Pattern 78 is generally an ellipse and pattern 80 is essentially a straight line representing respectively a 130° and a 180° phase relationship. In accordance with observations made using the setup illustrated in FIGURE 3, the voltage induced in the receiver coil may be indicated by a series of vectors 1, 2, 3 and 4 in FIGURE 5 which in that order represent increasing conductivity of the liquid or formations. In other words, with the coils in a non-conductive material such as air, the vector 1 is obtained indicating the 90° phase relationship or pattern 76. With a slightly conductive material, or conductive material such as water or salt water, vectors 2, 3 or 4 are obtained in that order. It should be very carefully observed that the amplitude decreases and also the phase angle (measured with respect to the 90° position) increases as the material is made more conductive. The locus of these vectors is indicated at 82 and it should also be carefully observed that this locus 82 is in the form of a hooked curve which tends to approach the origin, i.e., the condition corresponding to pattern 80 in FIGURE 4.

In FIGURE 6 vector 3 is resolved into two components, namely the vector 1 component which was obtained earlier with the coils in air and a vector 5 which is a vector which, when added to vector 1, results in vector 3. This vector 5 may thus be considered to be representative of changes in conditions, i.e., the change between air and formations as the surrounding medium.

As indicated previously, the 90°–270° direction is referred to as the direction of the quadrature or inductive component and is the direction of the voltage induced in the receiver coil 24 by direct action with the transmitter coil 20 when in air. Thus, vector 1 is an inductive vector in that it is at a 90° phase angle with respect to the transmitter coil current represented by vector $I_t$ and is induced as a result of the mutual inductance between the transmitter and receiver coils. The 0°–180° direction is referred to as the direction of the resistivity or in phase component or simply resistivity component. Vector 5 comprises a resistivity component and may be considered to be a resistivity signal in that its amplitude varies with the conductivity of the ambient liquid or formations.

FIGURE 7 illustrates vector 5 together with vector 6 and vector 7, vector 6 representing a condition of lesser conductivity and vector 7 representing a condition for greater conductivity. It has been noted that the amplitudes of these vectors 6, 5 and 7 vary substantially linearly with the conductivity of the ambient material when the conductivities are less than approximately 10 mhos per meter. The phase angle is very nearly 180° for material of about ½ mho per meter or less but increases with increase in conductivity. Both of these approximate values recited above which result in substantial linearity in amplitude and phase are for the condition wherein the transmitter coil current has a frequency of 20,000 cycles per second. The linearity is better and the phase shift is less at lower frequencies.

Now, for purposes of further analysis, assume that the balancing transformer 23 is included as shown in FIGURE 3 to produce a balancing voltage represented by vector 8 in FIGURE 8. Thus, it is noted that in the simplified induction logging tool shown in FIGURE 3 means in the form of a transformer 23 has been indicated for purposes of balancing out the vector 1. The primary winding 22 of this transformer is connected in series with the generator 21 and the resistance 70 and the secondary winding 25 of the transformer 23 is connected in series with the receiver coil 24 so that the voltmeter 74 then reads the vectorial sum of the voltages induced in receiver coil 24 and the voltage induced in the secondary winding 25.

FIGURE 8 illustrates vector 1 and vector 8 of equal magnitude and these vectors are opposite in phase so that their vectorial sum is zero. This condition corresponds to the condition wherein the quadrature component is balanced out by the use of the transformer 23 which is automatically accomplished in FIGURE 1 when the logging tool traverses formations of conductivity less than ½ mho per meter. This condition also corresponds to the condition wherein both coils 20 and 24 are surrounded by a very low conducting medium such as air in which latter case the voltmeter 74 reads zero.

FIGURE 9 illustrates that the resistive signal vector 5 may be resolved into 180° and 270° components, i.e. into corresponding vectors 10 and 9. Vector 10 is vector 5 times the cosine of the angle between vector 5 and the 180° axis. Vector 10, in accordance with the present teachings, should not in all cases, particularly under conditions of high conductivity, be taken as the resistive signal since it does not vary as linearly with conductivity as does vector 5.

It is noted that when the coils 20 and 24 are in air, balancing of the quadrature component is easy and such balancing consists in adjusting the mutual inductance between the primary and secondary windings so as to obtain a zero reading on the voltmeter 74. In a relatively low conductivity material of, for example, less than one-half mho per meter, the mutual inductance between the two windings 22 and 25 is automatically adjusted for minimum voltage as read by meter 74 and a resultant voltage having a 180° phase angle (both occur at the same setting of the quadrature coils 22 and 25); and, it is this 180° phase angle voltage which is recorded in FIGURE 1 when the conductivity is in this lower range.

FIGURE 10 represents the condition wherein logging is accomplished in a medium of high conductivity material of, for example, a conductivity greater than one-half mho per meter and contrary to the teachings herein, an attempt is made to record only the 180° or in phase component. It is noted that vectors 1, 11 and 5, when added, result in vector 13 which is the minimum voltage having a 180° phase angle. But it is noted that vector 11 is smaller than vector 1 by the amount of vector 9 (FIGURE 9). The sum of vectors 1 and 11 is vector 12 which is equal in amplitude to vector 9. Vector 12 plus vector 5 is vector 13 which is equal to vector 10 and the same is the 180° component of the resistive signal vector 5. This vector 13 is the same signal a phase-sensitive detector that recorded only the 180° component would record and is, of course, less than the magnitude of vector 5 which is recorded when in accordance with the teachings herein, the switch 29 (FIGURE 1) is opened.

FIGURE 11 illustrates the desired condition assumed when such switch 29 is opened in response to the magnitude of vector 5, it being noted that vector 8 was set when the coils were in air or automatically adjusted when in a very low conductive material. The sum of vectors 1, 8 and 5 is vector 5. Vectors 1 and 8 are in general very large compared to vector 5. Vector 1 will vary with variations in magnetic permeability or change in coil spacing that may occur with change in temperature as well as with other conditions but vector 8 is automatically changed accordingly. Thus, vector 8 is automatically adjusted so as to be equal in amplitude to vector but in opposite phase under these conditions of low conductivity, using the servo system illustration in FIGURE 1.

Thus FIGURE 1 illustrates one manner in which this adjustment may be made automatically while logging a bore hole. The quadrature balance coils 22, 25 are adjusted by a servomotor 66 operated by a phase null detector 26. When the motor is allowed to run, it moves in a direction that results in a 180° phase signal or a signal which has no 90° or 270° components, or just zero signal corresponding to the same condition when the coils are in air.

The motor 66 is further controlled by a switch 29 which is operated in accordance with the vectorial sum of the voltage appearing across the voltage responsive means 28. When the conductivity is less than ½ mho per meter (assuming a 20 kc. energizing system), the motor is allowed to run, i.e. the switch 29 is closed, so that the servo system automatically balances out the quadrature components. When the conductivity is greater than ½ mho per meter, the servomotor 66 is not allowed to run, i.e. the switch 29 is opened, thus avoiding in this instance the condition illustrated in FIGURE 10 and also in FIGURE 12.

FIGURE 12 indicates the condition wherein the switch 29 is operated. In FIGURE 12 true conductivity $\sigma_t$ is plotted as abscissae and the apparent conductivity is plotted as ordinates. The straight line 84 represents the ideal condition. The curve 86 represents the response of the system when logs are made while the servo system is continuously effective to balance out the quadrature component and curve 88 represents the condition where recording is accomplished in accordance with amplitude and not necessarily phase.

Thus, FIGURE 12 illustrates the relationship between apparent conductivity as a function of true conductivity, the apparent conductivity being that conductivity which is indicated or measured as indicated in FIGURE 1. The ideal function is a straight line where $$\frac{\sigma_a}{\sigma_t} = 1$$

Unfortunately, this is not the true condition for reasons mentioned herein.

The so-called "amplitude" curve in FIGURE 12 is the amplitude of the vector 5 as shown in FIGURE 6 and it is that quantity which is recorded by a non-phase-sensitive detector when the device is balanced. The "180° component" curve corresponds to the vector 10 of FIGURE 9 and it is that magnitude which is recorded by a phase-sensitive detector whether or not the device is balanced. FIGURE 12 also indicates the point at which the switch 29 in FIGURE 1 is opened to render the system shown in FIGURE 1 inoperative to record the 180° component and to allow the same to record the "amplitude" of the vector 5, the curve for which is illustrated by the "amplitude" curve in FIGURE 12. By thus employing this switching arrangement responsive to the amplitude of the receiver coil voltage, more accurate results are obtained, i.e. the amplitude curve follows more clearly the ideal curve than does the 180° component curve after the transition point 90.

To further enhance the accuracy and to simultaneously convert conductivity indications into resistivity indications, the ratio detector or reciprocal circuit 48 illustrated in block form in FIGURE 1 preferably takes the form illustrated in FIGURE 13.

In FIGURE 13 the D.C. signal representative of apparent conductivity is applied to the potentiometer resistance 94 which has its movable tap 95 connected to one input terminal of the null servo amplifier 96, the other terminal of said amplifier being connected to a grounded terminal 98 of the aforementioned resistance 94. This voltage thus developed between the tap 95 and the grounded terminal 98 is compared with a constant voltage in amplifier 96 and the servo amplfier develops an output or error signal on lead 100 which is applied to the servomotor 102 which, in turn, adjusts the tap 95 so as to reduce such error signal to zero. This motor also simultaneously adjusts the tap 104 on the second potentiometer resistance 106 having a constant D.C. voltage 108 applied across its terminals. The voltage developed between the tap 104 and the grounded terminal 110A is amplified in amplifier 110 and applied to the recording system as indicated in FIGURE 1.

The input to the null servo amplifier 96 is maintained constant, i.e.

$$k_1 = \frac{b}{c}\sigma_\mathrm{a}$$

where $k_1$ is a constant, $b$ is the value of resistance between tap 95 and terminal 98, and $c$ is the value of resistance 94. Thus, when $k_1$ varies from the constant value, the servo motor 102 runs changing the ratio $b/c$ to bring $k_1$ back to the constant value. It can be shown that the resistivity output appearing across the tap 104 and terminal 110 is equal to $$\rho = \frac{B}{C}k_2$$

where C is the value of resistance 106, B is the value of resistance between tap 104 and terminal 110 and $k_2$ is a constant. The dual operated potentiometers are matched such that $$\frac{B}{C} = \frac{\sigma_\mathrm{a}}{\sigma_\mathrm{t}}\frac{b}{c}$$

where $$\frac{\sigma_\mathrm{a}}{\sigma_\mathrm{t}}$$

is obtained from curves 84 and 88 in FIGURE 12.

In such case the expression for the resistivity is as follows:

$$\rho = \frac{k_1 k_2}{\sigma_\mathrm{t}}$$

In other words, a true resistivity signal is developed which is proportional to the reciprocal of the true conductivity.

It will be appreciated that the source 108 represented as a D.C. source may also comprise an A.C. source, and, in such case, the A.C. voltage developed on tap 104 is rectified before being applied to a recording galvanometer of the D.C. type.

FIGURE 15 illustrates a modification of the system shown in FIGURE 13 in that the taps 95 and 104 in FIGURE 13 corresponding to taps 95A and 104A in FIGURE 15 are not moved to the same degree in a linear sense but are moved non-linearly to achieve the desired correction. For this purpose of providing the correction between apparent and true conductivity the motor output shaft 102A which may be driven by a suitable reduction gear system incorporated in motor 102 serves to move the tap 95A in a linear sense and to move the tap 104A in a non-linear sense through cam means 102B. This cam means 102B is so contoured that with the total value of resistance 106A being equal to the total value of resistance 94A, a voltage is developed at the cam operated tap 104A which varies in the ratio of $$\frac{\sigma_\mathrm{a}}{\sigma_\mathrm{t}}$$

As before the value of voltage corresponding to apparent conductivity is applied across resistance 94A (corresonding to 94 in FIGURE 13) and either a constant D.C. voltage or a constant A.C. voltage, as explained above, is applied across resistance 106A (corresponding to 106 in FIGURE 13) so that the voltage developed and applied to the recording circuit is not only reciprocated but also corrected when and as the cam 102B moves its following roller 102C to move the tap 104A non-linearly with respect to movement of tap 94A.

It will be appreciated that the particular means for automatically adjusting the quadrature component 8 in FIGURE 11 may take other forms than that indicated. An alternative arrangement is one, where instead of providing an adjustable mutual inductance 23 as in FIGURE 1, the phase detector or phase meter in FIGURE 1 is used to develop an automatic gain control for an amplifier which is coupled between the transmitter and receiver coils 20 and 24 for controlling the amplitude of a bucking or balancing voltage i.e. voltage 8, transferred from the oscillator 21 to the receiver coil 24.

It has also been determined experimentally that in low conductivity formations the eddy current, an alternating current lags the transmitter current by 90 degrees and that as the conductivity increases the amplitude of such eddy current increases and also its lag behind the transmitter current increases also. Correspondingly, the increased eddy current induces an increased voltage which lags in correspondingly increased amounts in the receiver coil.

FIGURE 14 illustrates an attempt to establish mathematically the relationship between the transmitter current in coil 20 and the voltage developed in the receiver coil 24 as a function of varying conductivity. Thus, FIGURE 14 illustrates one transmitter coil 20 and the magnetic field set up by it and also illustrates one loop 114 of formation or radius $r$ and cross section $dr$, $dz$, with the induced eddy current of current density $j$ and the magnetic field set up by the eddy current. This FIGURE 14 shows also one receiver coil 24 which is linked by the magnetic field of both the transmitter coil and the eddy current. Thus, the direction of current flow in coil 20 and loop 114 are shown in conventional means using a plus sign representing the tail of an arrow and a dot for indicating the tip of the arrow. The flux produced by coil 20 and threading only the coil 24 is indicated at 116. The transmitter flux threading the loop 114 is indicated at 118. And the flux produced by the eddy current in loop 114 is indicated at 120. With the coils in air and the transmitter coil current being $$i = I_\mathrm{p} \sin \omega t$$

it can be shown that the quadrature component of the receiver coil voltage may be expressed by the following equation:

$$V_{90°} = -\frac{4\pi f I_\mathrm{p}(An)_\mathrm{r}(An)_\mathrm{t}}{L^3} \cos \omega t$$

where $f$ is the frequency, $(An)_\mathrm{r}$ is the area times the number of turns on the receiver coil, $(An)_\mathrm{t}$ is the area times the number of turns on the transmitter coil and L is the spacing between the two coils, as shown.

This voltage $V_{90°}$ is the inductive component represented by vector 1 in FIGURE 11. Making an assumption that the impedance of the formation loop 114 constitutes a pure resistance and that the eddy current is small enough so as not to change the magnetic field set up by the transmitter coil (an assumption which is not strictly true when such eddy current is high), it can be shown that the eddy current may be expressed by the following equation:

$$j \, dr \, dz = -\frac{2\pi f r \sigma \, dr \, dz \, I_\mathrm{p}(An)_\mathrm{t}}{\left[r^2 + \left(\frac{L}{2} + z\right)^2\right]^{3/2}}$$

where $\sigma$ is the specific conductivity and $r$ and $z$ are as indicated in FIGURE 14.

This eddy current induces a voltage in receiver coil which can be demonstrated to be expressed by the following equation:

$$V_{180°} = -\frac{16\pi^3 f^2 (An)_\mathrm{r}(An)_\mathrm{t} I_\mathrm{p}}{L^3} \int_{-\infty}^{z=+\infty} \int_0^{r=\infty} \frac{\sigma\left(\frac{L}{2}\right) r^3 \, dr \, dz}{\left[r^2 + \left(\frac{L}{2} + z\right)^2\right]^{3/2}\left[r^2 + \left(\frac{L}{2} - z\right)^2\right]^{3/2}} \sin \omega t$$

This voltage $V_{180°}$ is in general the resistive component of the signal corresponding to vectors 5, 6 or 7. This equation indicates the phase angle to be 180°. However, as indicated above, experiments show that this is only approximately true for low conductivity materials and the deviation is greater, the greater the conductivity.

Based on these assumptions, these equations may serve some useful purposes and have been used in design of multi-coil induction logging systems but the same are not, in accordance with the present teachings, considered sufficient to provide an accurate evaluation, particularly when the ambient formations are of high conductivity. Based solely on these mathematical considerations, one would believe that a phase-sensitive voltmeter that indicates only the 180° component of the received signal would be sufficiently accurate under all conditions, particularly if means were provided to balance out the 90° or 270° component of the receiver coil voltage to the extent that the phase-sensitive voltmeter is not over loaded by their components. However, in practice this is not so as indicated by the experiments referred to with respect to FIGURE 3.

The above mathematical considerations fail to take into account the effect of the magnetic field produced by one formation loop 114 with the magnetic field produced by a second formation loop 122 and vice versa, and thus fails to take into consideration what may be considered to be a "shielding effect" between the receiver and transmitter coils, such effect being due to the magnetic field set up by current flowing in the individual and variously spaced formation loops, two of an infinite number of which are represented at 114 and 122.

Thus, considering the effect of the two formation loops 114 and 122, the eddy current in the second loop 122 is induced by the magnetic field of the transmitter coil 20 and also by the current flowing in the first formation loop 114. These magnetic fields are at zero° and 90° phase angles. It follows that the magnetic field set up by this second loop must be between 90° and 180° and thus shifts with increased formation conductivity as mentioned previously.

Of course, the eddy current in the first loop 114 is dependent on the eddy current in the second loop 122 and vice versa and that the eddy current in any one particular loop is independent of the current in other formation loops. For a more detailed analysis the space near the coils may be divided into loops, perhaps fifty loops, an equation of current written for each loop, the equations solved simultaneously and the induced voltage in the receiver coil computed. Some work has been done along this line using commercial computing machines. However, it is quite laborious and limited in accuracy due to the limit in number of formation loops. Other considerations involve the fact that in FIGURE 14 the lines of magnetic field represented at 120A that encircle the cross section $dr$, $dz$ may be though of as the curl of the magnetic field, i.e. $\nabla \times \overline{H}$, as explained more clearly in Page, Introduction to Theoretical Physics, 2nd edition, 1935, D. Van Nostrand Co., where $\overline{H}$ is the magnetic field. Earlier, in assuming that the eddy current is small enough not to change the magnetic field set up by the transmitter coil, it was assumed that the curl of the vector is zero. However, from theoretical considerations it is known that the curl is $4\pi$ times the current density, i.e.

$$\nabla \times \overline{H} = 4\pi j$$

and that the divergence of the magnetic field is zero. If a vector potential V is defined such that $$\nabla \times \overline{V} = \overline{H}$$

the relationship can be written in the form of Poisson's equation $$\nabla^2 V = 4\pi j$$

A rigorous analysis requires the solution of this equation for elimination of the assumptions and approximations made earlier.

The arrangement shown in FIGURE 1 thus recognizes the shortcomings of the theory and equations that are developed and the magnitude and phase of signals developed by experiment as in FIGURE 3, allow instrumentation which is improved over what is now in common use.

Having fully described my invention, it is to be understood that I do not wish to be limited to the details herein set forth, but my invention is of the full scope of the appended claims.

I claim:

1. In an induction well logging system wherein a transmitter coil in a bore hole logging tool induces a quadrature component in a receiver coil while simultaneously inducing eddy currents in ambient formations, which eddy currents, in turn, cause an in phase component to be induced in said receiver coil, the improvement which resides in providing first means for automatically balancing out said quadrature component when said logging tool traverses formations of low conductivity, and including also second means for rendering said first means inoperative to balance out further changes in said quadrature component when said logging tool traverses formations of conductivity greater than said low conductivity.

2. The improvement set forth in claim 1 including means continuously operative to amplify the sum of said in-phase and quadrature components induced in said coil and as modified by said first means.

3. The improvement set forth in claim 1 in which said transmitter coil is energized with a current of approximately 20 kilocycles per second and said low conductivity is a conductivity less than approximately one half mho per meter.

4. A system as set forth in claim 1 including means for recording the net voltage induced in said receiver coil, said recording means including means for modifying said net voltage prior to recording by a factor represented by $$\frac{\sigma_a}{\sigma_t}$$

where $\sigma_a$ is the apparent conductivity of the formations and $\sigma_t$ is a measure of the true conductivity of the formations.

5. A system as set forth in claim 4 wherein said recording means includes means connecting outside terminals of a first potentiometer resistance to said induced voltage source, a second potentiometer resistance, a second source having its terminals connected to the outside terminals of said second potentiometer resistance, a servo-system including means for adjustably positioning the taps on said first and second resistances, said servo-system incorporating means coupled between one of the outside terminals of said first resistance and the tap there on for controlling said positioning means in accordance with the voltage between said tap on said first resistance and said one terminal of said first resistance, means coupled between one of said outside terminals of said second resistance and the tap thereon for indicating the voltage between the last mentioned and the last mentioned terminal, and means for modifying the last mentioned voltage such that it is a function of a voltage developed between said tap on said one resistance and one terminal of said one resistance which function is represented by $$\frac{\sigma_a}{\sigma_t}$$

where $\sigma_a$ is the apparent conductiivty of the formations and $\sigma_t$ is a measure of a true conductivity of the formations.

6. In an induction well logging system wherein a transmitter coil in a bore hole logging tool induces a quadrature component in a receiver coil while simultaneously inducing eddy currents in ambient formations, which eddy currents, in turn, cause an in phase component to be induced in said receiver coil, the improvement which resides in providing first means automatically balancing out said quadrature component when the vectorial sum of said components developed in the receiver coil and unmodified by said first means is less than a predetermined magnitude, and second means automatically rendering said first means ineffective to balance out further changes in said quadrature component when said vectorial sum unmodified by said first means exceeds said predetermined magnitude.

7. In an induction well logging system wherein a transmitter coil in a bore hole logging tool induces a quadrature component in a receiver coil while simultaneously inducing eddy currents in ambient formations, which eddy currents, in turn, cause an in phase component to be induced in said receiver coil, the method comprising the steps of recording substantially only the in phase component when and as said logging tool traverses formations of low conductivity and recording the vectorial sum of said components induced in the receiver coil when said logging tool traverses formations of conductivity greater than said low conductivity, said vectorial sum being a summation of said components when said quadrature component is present in effecting such summation.

8. In an induction well logging system wherein a transmitter coil in a bore hole logging tool induces a quadrature component in a receiver coil while simultaneously inducing eddy currents in ambient formations, which eddy currents, in turn, cause an in phase component to be induced in said receiver coil, the combination comprising first means automatically effective to reduce said quadrature component to substantially zero, and second means for rendering said first means ineffective, and third means responsive to the vectorial sum of the in-phase and quadrature components induced in said receiver coil and unmodified by said first means for operating said second means.

9. The combination set forth in claim 8 including means continuously responsive to amplify and record the vectorial sum of said in-phase and quadrature components developed in said receiver coil as modified by said first means.

References Cited in the file of this patent

UNITED STATES PATENTS

| | | |
|---|---|---|
| 2,220,070 | Aiken | Nov. 5, 1940 |
| 2,582,315 | Doll | Jan. 15, 1952 |
| 2,624,510 | La Coste | Jan. 6, 1953 |
| 2,714,309 | Redemske | Aug. 2, 1955 |
| 2,723,357 | Schuster | Nov. 8, 1955 |
| 2,726,365 | Bilderback | Dec. 6, 1955 |
| 2,788,483 | Doll | Apr. 9, 1957 |
| 2,790,138 | Poupon | Apr. 23, 1957 |
| 2,886,244 | Hunt | May 12, 1959 |
| 2,889,988 | Toth et al. | June 9, 1959 |
| 2,890,832 | Stone | June 16, 1959 |
| 2,929,984 | Puranen et al. | Mar. 22, 1960 |
| 2,931,972 | Tilley | Apr. 5, 1960 |
| 2,949,779 | McKenney et al. | Aug. 23, 1960 |
| 2,950,054 | Modie | Aug. 23, 1960 |

FOREIGN PATENTS

| | | |
|---|---|---|
| 210,928 | Australia | Oct. 24, 1957 |